No. 837,262. PATENTED NOV. 27, 1906.
J. C. CROMWELL.
BEARING.
APPLICATION FILED APR. 22, 1904.

WITNESSES:
L. Davis
G. W. Saywell

INVENTOR:
John C. Cromwell
by his attorney
J. D. Fay

UNITED STATES PATENT OFFICE.

JOHN C. CROMWELL, OF CLEVELAND, OHIO.

BEARING.

No. 837,262. Specification of Letters Patent. Patented Nov. 27, 1906.

Application filed April 22, 1904. Serial No. 204,343.

*To all whom it may concern:*

Be it known that I, JOHN C. CROMWELL, a citizen of the United States, and a resident of Cleveland, county of Cuyahoga, and State of Ohio, have invented a new and useful Improvement in Bearings, of which the following is a specification, the principle of the invention being herein explained and the best mode in which I have contemplated applying that principle so as to distinguish it from other inventions.

My invention relates to bearings for rotating shafts, and is particularly designed for such shafts as are subject to strains tending to displace them laterally and to cause them to oscillate.

The broad invention, while capable of use in many structures, is particularly adapted for the mounting of bowl-shafts of centrifugal separators, since in such apparatus the highest speeds are attained or sought to be attained and the slightest deviation of the load from perfect balance will cause the shaft to tend to oscillate in the most marked manner and cause it to cramp its bearings and buckle out of shape. This tendency is further accentuated and at the same time complicated by sidewise thrust or pull of the power-transmitting mechanism. The conditions therefore obtaining in centrifugal separators are such as have hitherto rendered it practically impossible to simultaneously use antifriction-bearings and allow for the oscillation and sidewise shifting of the shaft so as to permit the disturbing strains to be counteracted without distortion of the shaft or cramping of the bearings. I have, however, invented a structure in which the shaft is mounted in antifriction-bearings, so that it will be free to oscillate under disturbing strain, and such oscillation will take place without the bearings being cramped.

The annexed drawings and the following description set forth in detail certain means embodying the invention, such disclosed means constituting but one of various mechanical forms in which the principle of the invention may be used.

Figure 1:
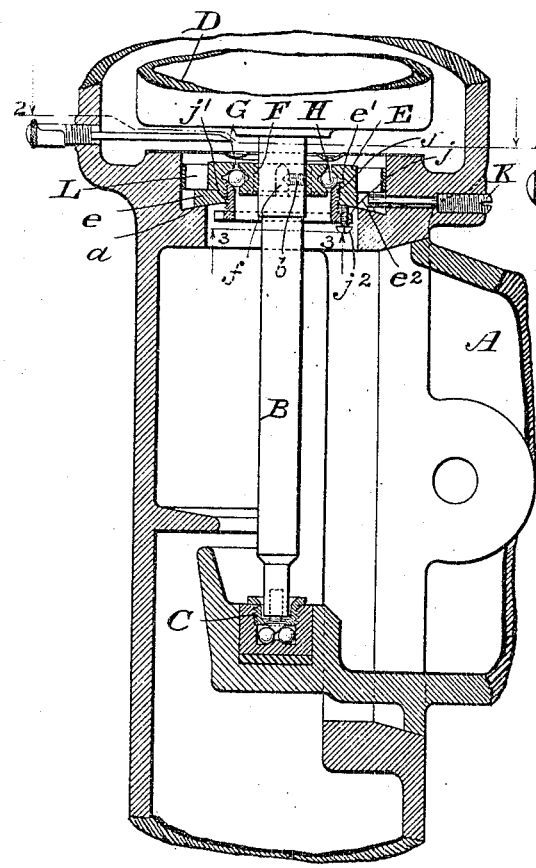
Figure 2:
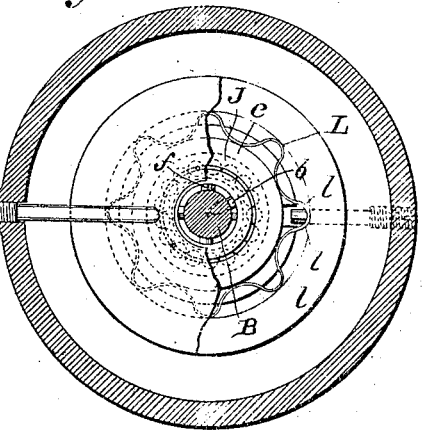
Figure 3:
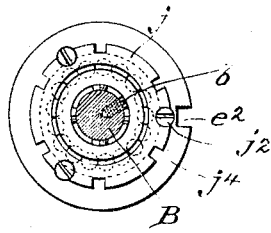
Figure 5:
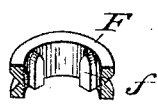
Figure 4:
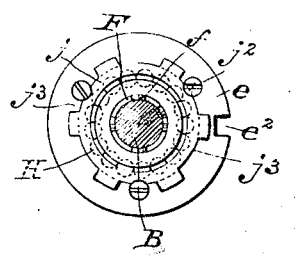

In said annexed drawings, Figure 1 represents a broken vertical sectional view of the frame of centrifugal separator with adjacent and connecting parts, showing the shaft supported in and having secured to it my improved bearing, said shaft being mounted upon a suitable lower bearing forming no part of this invention. Fig. 2 represents a partial plan view and partial horizontal section taken upon the planes indicated by the lines 2 2, Fig. 1. Fig. 3 represents a bottom plan view of my improved bearing, taken upon the plane indicated by the line 3 3, Fig. 1. Fig. 4 represents a view similar to that of Fig. 3, of a slightly-modified construction of bearing; and Fig. 5 represents a central vertical section of an inner bearing-collar forming an element of my invention.

My invention is adapted to a great variety of uses, but is especially serviceable when applied to the shaft of the bowl of a centrifugal separator, and I have shown and will now proceed to describe it as applied to such use.

The part of the supporting-frame of one type of centrifugal separator is illustrated at A in Fig. 1, and the shaft for the bowl thereof is shown at B, suitably mounted in a lower bearing C. Upon this shaft B is supported the separating-bowl D, as shown in broken section in Fig. 1. These features form no part of my invention and merely serve to illustrate its use as thus applied to a centrifugal separator. Carried upon the upper part of the shaft B and supporting the same is the improved bearing, which forms the subject-matter of this invention. Said bearing comprises a main ring E, provided at one end with an angular flange *e*, having an outer curved surface, as shown, the purpose of which curved surface will be hereinafter fully explained. This flange *e* rests upon a shoulder *a*, suitably secured to the supporting-frame A or preferably forming an integral inwardly-projecting part of the same, which shoulder is provided with an upper curved surface complementary to that of the flange *e*. Inclosing the spindle B and within the ring E is a bearing-collar F, provided upon its inner periphery with a plurality of lugs *f*, pointed at one end and running parallel with the axis of the spindle B. A ball-race G is formed by an inner ball-groove in the ring E and an outer ball-groove in the collar F, and suitable balls H are provided therefor. An auxiliary or adjusting ring J is provided which has a flange *j* and is externally screw-threaded at *j'* and adapted to screw into a similar thread *e'*, cut in the inner periphery of the ring E, such latter thread extending from that end of the ring E contiguous to the flange e up to the wall of the ball-race. The inner end of said auxiliary ring J is adapted to screw down closely to the balls H and to thus hold the bearing-collar F in place. Screws $j^2$ are tapped into the flange $j$ of the auxiliary ring J and bear up against the flange e of the main ring E, as shown in Figs. 1 and 3. In the modification shown in Fig. 4 these screws $j^2$ are tapped into the flange e of the main ring E, and the heads of the same bear upon the flange $j$ of the adjusting-ring J, parts of said latter flange being cut away, as shown at $j^3$, to allow for a slight turning of the ring J under the heads of the screws $j^2$. The flange e of the main ring E is provided with a notch $e^2$, into which projects a pin K, screwed in through the frame from the outside and which prevents the rotation of the sleeve E. The shoulder $j$ of the adjusting-ring J is provided with a number of small notches $j^4$, by means of which it may be tightened up with a spanner-wrench. When the parts of the bearing have been assembled, as shown in Fig. 1, the separating-bowl D and the shaft B are connected to the frame by passing the shaft through the bearing and setting the lower end of the shaft in the lower bearing C, the lugs $f$ in the collar F allowing by reason of their number and their pointed upper ends a stud $b$, secured upon the upper part of the shaft B, as shown in Fig. 1, to be readily caught and retained between any two of such lugs $f$, whereby the rotation of the collar F is effected.

A ring of flexible resilient material L, provided with transverse corrugations $l$, surrounds the body portion of the main ring E intermediately of said body portion and the frame A, as shown in Figs. 1 and 2, acting as a cushion for the bearing and serving to center and steady the shaft B during the operation of the separator. During the rapid rotation of the bowl D both it and the shaft B vibrate considerably, the axis of vibration or oscillation passing through the lower bearing C, the point of oscillation being fixed and located at the lower end of the shaft B. In order that the strain of these lateral movements might not be sustained by the frame or be communicated to the same and in order that the shaft might be always centered— i. e., have the parallelism of its axis and that of the bearing-axis constantly maintained, I have provided an automatically-adjustable feature by causing the shaft B to be oscillatory and laterally movable about its lowermost point as a center, such movements of said shaft being permitted by the free play upon its curved surface of the flange e over the curved shoulder a, which forms a stationary guiding-surface for the bearing during its lateral movements. As will be noted, I have formed the flange e and the shoulder a with complementary curved surfaces, both surfaces being parts of the surface of a sphere, which has its center at the lowermost point of oscillation or vibration of the shaft B, or, in other words, the radius of curvature of the flange e and shoulder a is equal to the distance from the lowermost end of the shaft B to the curved surface of the flange e or shoulder $a$. A suitable space has been provided upon the shoulder a to allow for the lateral play of the flange e. The surrounding resilient ring of flexible material L compensates for the lateral movements of the shaft and bearing and prevents them from being transmitted to the supporting-frame A. As thus applied to a centrifugal separator my improved bearing allows the bowl and shaft to vibrate freely and enables such vibrations to be taken up without any consequent jars to the frame or rocking motions of the same.

Having described my invention in detail, that which I particularly point out and distinctly claim is—

1. In combination, a vertical rigid rotatable shaft adapted to support a load, and two sets of antifriction-bearings for said shaft, one of said sets of antifriction-bearings adapted to permit lateral shifting of the shaft, the second of said sets of antifriction-bearings arranged to permit the shaft to tilt therein.

2. In combination, a support and a vertical rigid shaft adapted to support a load, a set of antifriction-bearings disposed between the support and shaft in such manner as to receive the longitudinal thrust of the latter, and a set of antifriction guiding-bearings held about the shaft and yieldingly supported so as to be capable of sidewise oscillation in a curve having its center substantially in the zone of the thrust-bearings.

3. In combination, a support and a vertical rigid shaft adapted to support a load, a group of antifriction-bearings disposed between the support and the shaft and adapted to receive the longitudinal pressure of the latter, and a second group of antifriction-bearings disposed around the shaft and capable of sidewise oscillation with the shaft and so supported that the relative positions of the shaft and the last-named group of bearings remain constant during the oscillation.

4. In combination, a support, a vertical rigid shaft adapted to support a load, a ring surrounding the shaft, antifriction-rollers interposed between said shaft and said ring, said ring having a spherical surface contacting with a spherical surface on the support and antifriction-rollers held by the support about the shaft so as to receive axial thrust therefrom, said spherical surfaces having their center of curvature substantially within the zone of contact between the shaft and the said thrust-bearing.

5. The combination with a laterally-movable antifriction-bearing, of a vertical rigid revoluble shaft adapted to carry a load, said shaft being fixed against transverse oscillation at one point in its axis external to the bearing and arranged to move freely in directions transverse to its axis at all other points, and a second antifriction-bearing arranged to receive axial thrust from the shaft about the said fixed point.

Signed by me this 20th day of April, 1904.

JOHN C. CROMWELL.

Attest:
A. E. MERKEL,
G. W. SAYWELL.